United States Patent

Hofer et al.

[11] Patent Number: 6,138,498
[45] Date of Patent: Oct. 31, 2000

[54] METHOD OF OPERATING A COATING APPARATUS AND A MEASUREMENT APPARATUS THEREFOR

[75] Inventors: Hans-Herbert Hofer, Otterfing; Reinhard Sangl, Rudelzhausen; Josef Weigl; Rainer Rauch, both of München, all of Germany

[73] Assignee: Mutek Analytic GmbH, Germany

[21] Appl. No.: 09/150,576

[22] Filed: Sep. 10, 1998

[30] Foreign Application Priority Data

Sep. 11, 1997 [DE] Germany ........................... 197 40 018

[51] Int. Cl.$^7$ ........................................................ G01N 7/00
[52] U.S. Cl. ............................................. 73/19.1; 73/19.05
[58] Field of Search .............................. 73/19.01, 19.05, 73/19.1

[56] References Cited

U.S. PATENT DOCUMENTS

| 2,138,141 | 11/1938 | Cromer et al. | 73/19.05 |
| 2,141,977 | 12/1938 | Gray | 73/19.01 |
| 3,731,530 | 5/1973 | Tanguy et al. | 73/152.42 |
| 3,968,678 | 7/1976 | Krener et al. | 73/19.01 |
| 4,089,206 | 5/1978 | Raffel et al. | 73/19.1 |
| 4,329,869 | 5/1982 | Toda | 73/19.1 |
| 4,700,561 | 10/1987 | Dougherty | 73/19.05 |
| 4,862,729 | 9/1989 | Toda et al. | 73/19.05 |
| 5,442,948 | 8/1995 | Cowing | 73/19.05 |

FOREIGN PATENT DOCUMENTS

| 3433017 | 3/1986 | Germany | 73/19.1 |
| 3633739 | 4/1988 | Germany . | |
| 5-126711 | 5/1993 | Japan | 73/19.01 |
| 974183 | 11/1964 | United Kingdom | 73/19.1 |

OTHER PUBLICATIONS

Voss, Heinz F. "Die Beseitigung storender Lufteinschlusse in Streichfarben durch chmeische Hilfsmittel" Wochenblatt fur Paperfabrikation, vol. 2, 1977, pp. 51–56.

*Primary Examiner*—Daniel S. Larkin
*Attorney, Agent, or Firm*—St. Onge Steward Johnston & Reens LLC

[57] ABSTRACT

During the application of a coating material to paper or to cardboard, air inclusions in the coating material can interfere with production in various ways. It is proposed to measure the air inclusion content in a coating material by taking samples of the material. Each sample is introduced at a predetermined first pressure into a measurement cell which has a closed first volume. This closed first volume in then reduced to a closed second volume at which a predetermined second pressure that is greater than the first pressure prevails in the measurement cell. The air inclusion content of the coating material can then be derived from the change in volume required to produce the predetermined pressure change. On the basis of the measured values, degassing equipment can be optimally adjusted.

14 Claims, 2 Drawing Sheets

METHOD OF OPERATING A COATING APPARATUS AND A MEASUREMENT APPARATUS THEREFOR

FIELD OF THE INVENTION

The present invention relates to a method of operating a coating apparatus for the application of a coating material to paper or to cardboard in a coating machine or in a paper or cardboard manufacturing machine, and to a measurement apparatus for use in the method.

DESCRIPTION OF THE PRIOR ART

Paper and cardboard are known to be composed of individual fibers; as a result, during the printing of such materials the surface roughness and superficial pores, the size of which corresponds approximately to the fiber dimensions, become undesirably noticeable. To eliminate these irregularities and obtain a smooth-structured surface highly suitable for printing, pieces of paper and cardboard are covered with coatings by applying to one or both sides a mixture of water, and binding agents as well as additives with various functions. These coatings must be applied with the greatest possible uniformity.

The gas content of such coatings presents a major problem. If the content of free gas, which depends on the recipe of the coating, the application apparatus, and the transport velocity in the coating machine, exceeds a certain proportion then the possible results include skip-coating, i.e. uncoated places, crater formation owing to air inclusions in the coating, roughened spots, and a general impairment of the coating morphology.

In addition to quality deficiencies of this sort in the finished paper, gas contained in the coating can also interfere with the production process; for example, a very high gas content may cause excessively strong foaming of the coating material, tears in the paper sheet, and a progressive deterioration in the efficiency of pumps.

The main causes of high gas contents, or of a high content of air inclusions in coatings, are as follows: a mechanical introduction of air during dispersant treatment and the preparation of the coating; chemical decomposition of the customary coating pigment calcium carbonate and an associated formation of dissolved and free carbon dioxide; the adsorption of gases to pigments; processing sites at which the coating falls freely or passes through open sieves that allow air to enter; the introduction of air at the dynamic contact line during application of coating in the coating equipment, which increases at higher machine speeds; and also the employment of talcum or other interface-active substances, when special coating recipes are used. Furthermore, it can be said that, in general, a high content of solids will also be associated with a high content of air inclusions, although for various reasons it is desirable to make the solid content in the applied coating as high as possible.

The gases can be present as free gases, in the form of small bubbles, or can be dissolved. The problems described above are caused mainly by free gases present in bubble form. However, dissolved gases can at any time be converted to free gases by pressure and/or temperature fluctuations, so that they also represent a certain risk factor.

The degassing of coatings can be achieved by adding chemicals or by mechanical apparatus. However, both of these involve relatively expensive procedures. One problem with chemical additives is that they increase the liquid content of the coating because the coating must be applied so that when dry its mass per unit area of the paper is constant so that the costs of drying are increased. Furthermore, such chemical additives increase the cost of the coating itself. This is known, for example from *DEZ: Wochenblatt für Papierfabrikation* 2 (1997) 51–56, a publication which describes a method of determining the amount of enclosed air by measuring the volume of foam that forms during stirring. This measurement is both expensive and time-consuming.

German patent DE 36 33 739 C2 discloses a method of analyzing the air content of a liquid or a suspension, in which ultrasonic waves are introduced into the liquid or suspension. From the attenuation or scatter of the ultrasonic waves, the air content is determined. This procedure is also extremely expensive, in particular with regard to the apparatus.

The object of the present invention is to develop a method and an apparatus in such a way that the result of the coating process can be improved by simple means.

SUMMARY OF THE INVENTION

According to a first aspect of the present invention, there is provided a method of operating a coating apparatus for the application of a coating material to paper or to cardboard, comprising the steps of introducing a sample of the coating material into a measurement cell with a closed first volume at a predetermined first pressure; reducing the closed first volume to a closed second volume at which a predetermined second pressure that is greater than the predetermined first pressure prevails within the measurement cell; deriving the air inclusion content of the sample from the change in volume necessary to produce the pressure change; and using the measured air inclusion content of the sample to control degassing means for at least partly removing the air inclusion in the coating material before it is applied by the coating apparatus.

In the method, a "compressibility measurement" is carried out with a liquid, which of course in itself is not compressible. By this means, the air content enclosed in the sample can be ascertained in a surprisingly simple manner and with high precision.

Preferably, the first volume is reduced to the second volume substantially within a predetermined period of time. As a result, especially reproducible results are obtained, chiefly because within this time only slight and, above all, constant amounts of gas become dissolved in the fluid and only slight (and above all constant) temperature changes are produced.

The predetermined first pressure is preferably substantially equal to the atmospheric pressure, which can be very simply achieved by opening the measurement cell, after it has been filled with the sample, so that it communicates at least briefly with the atmosphere.

A mechanical and/or chemical degassing means is preferably adjusted according to the derived air inclusion content and preferably automatically controlled thereby. As a result, an optimal coating can be achieved in a particularly reliable manner. When chemical degassing agents are used, the amount of degassing agent is controlled according to the derived air inclusion content, so that an optimal amount is used.

Preferably, the air inclusion content of the coating is adjusted to a maximal level, namely the Maximal Air Limit, at which there is no appreciable impairment of coating morphology, no crater formation, and/or no uncovered places. That is, no more degassing is done than is necessary to ensure an acceptable result of the coating process. As a result, the costs of drying the coated paper/cardboard are minimized. This procedure is especially surprising in view of the fact that previously the opposite approach was taken; it was assumed that maximal degassing should be ensured in order to obtain optimal coating results.

After the air inclusion content has been derived, the measurement cell is preferably rinsed with fresh water to remove completely the remnants of the sample. Reproducible measurements are thereby achieved, even over a long period of time.

According to a second aspect of the present invention, there is provided a measurement apparatus for use in the operation of a coating apparatus for applying a coating material to paper or to cardboard and comprising a measurement cell defining at least one inlet/outlet; controllable valve means for the inlet/outlet whereby the measurement cell can accommodate an introduced sample of the coating material in a first predetermined volume at a first predetermined pressure; volume-changing means attached to the measurement cell whereby the first predetermined volume can be reduced to a second volume; a volume meter for measuring the change in volume of the measurement cell effected by the volume-changing means; a pressure meter for measuring the pressure in the measurement cell; control means connected to the pressure meter, to the volume-changing means and to the valve means and operable such that after the sample has been introduced into the measurement cell and the valve means have been closed, the first volume is reduced to the second volume whereat the pressure in the measurement cell reaches a predetermined second value; and evaluation means which is operable to derive the air inclusion content of the sample from the difference between the first and second pressure values and the difference between the first and second volumes and to generate a corresponding measurement signal.

Preferably, the control means comprises a timing mechanism and is so constructed such that the reduction from the first volume to the second volume occurs essentially within a predetermined time span. As a result, high reproducibility of the results is guaranteed.

The evaluation means is preferably connected to the degassing means by way of a control line, in such a way that the operation of the degassing means can be controlled according to the measurement signal. This arrangement allows optimal coating to be achieved in a simple manner.

The evaluation means preferably comprises a maximal-level adjustment device and is designed to cooperate with the degassing means in such a way that the air inclusion content of the coating material is set at a maximal level, namely the Maximal Air Limit, at which there is no appreciable impairment of the coating morphology, no crater formation, and/or no (or only insignificant) uncovered places.

Preferably, the volume-changing means comprises a piston that can be pushed into the measurement cell by means of a drive motor, while remaining sealed to walls of the measurement cell by way of a membrane. Such an arrangement is extremely simple and reliable in operation.

The volume-changing means in an especially preferred embodiment of the invention is constructed as a diaphragm-type dosing pump, with a rotating drive. The volume meter is preferably an angle-of-rotation indicator, which monitors the angle of drive rotation. By this means, a very precise measurement can be made in a simple manner.

Preferably, a rinsing valve to allow the input of fresh water into the measurement cell is disposed in parallel to an inlet valve through which the sample is introduced into the cell, so that even in the long term exact and, above all, reproducible measurements can be achieved.

The present invention will now be described by way of example with reference to the accompanying drawings.

DESCRIPTION OF THE PREFERRED EMBODIMENTS

Figure 1:
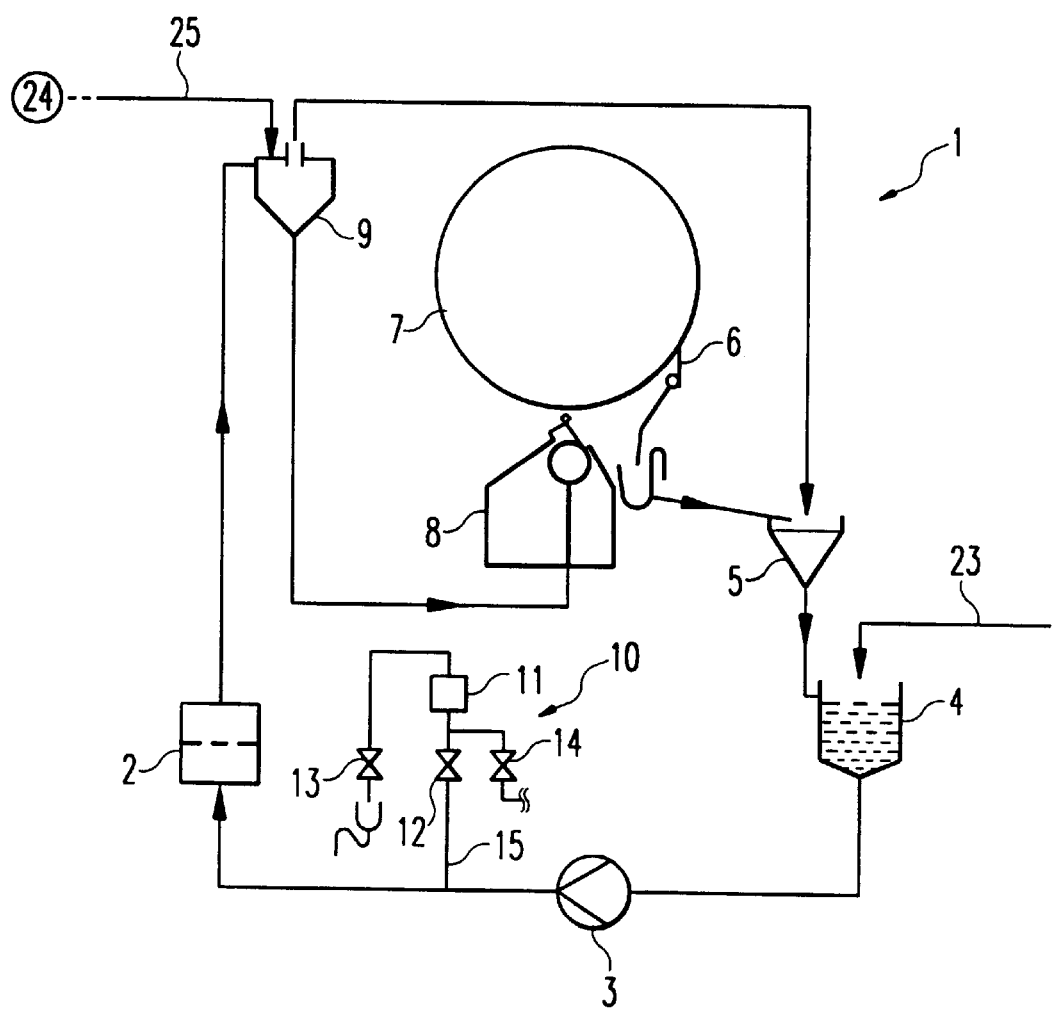
FIG. 1 is a schematic drawing of a coating apparatus.

In the following description, the same reference numerals are used for identical parts or parts with identical actions.

FIG. 1 shows schematically a coating apparatus 1, in which a coating material passes through a delivery pipe 23 from a coating preparation device (not shown) into an operating container 4. The coating material is transported out of the operating container 4 by a pump 3 and passes through a pressure filter 2 into a degassing means 9, which can comprise mechanical devices of a kind known per se and/or means for the addition of chemical agents for the removal of disturbing air inclusions. In FIG. 1, the latter is symbolized by a control lead 25, which can for instance control a dosing pump that mixes such chemical agents with the coating material.

A coating-delivery mechanism 8 takes coating material out of the degassing means 9 in amounts that correspond to the desired application thickness; these are transferred to a cylinder 7 by means of which the coating material is then applied to the paper or cardboard. Excess material transported by the pump 3, along with foam, is transferred from the degassing means 9 into a shaking sieve 5, which also receives remnants of coating material that have not been applied to the sheet of paper or cardboard and are removed from the cylinder 7 by a wiper 6. From the shaking sieve 5, the coating material returns to the operating container 4. The basic features of such an arrangement are described, for example, in *Papiermacher Taschenbuch*, Dr. Curt Haefner Verlags-GmbH, Heidelberg (1996).

On the pressure side of the pump 3 is attached a measurement apparatus 10 with an inlet pipe 15, which is connected to a measurement cell 11 by way of a controllable inlet valve 12. Disposed in parallel with the inlet valve 12 is a rinsing valve 14, by way of which fresh water from a fresh-water supply (not shown) can be put into the measurement cell 11. The measurement cell 11 is further attached by way of an outlet valve 13 to a container in which the coating material removed from circulation by way of the inlet pipe 15 and the rinsing water are kept until they are returned to circulation or discarded.

The measurement apparatus 10 indicated in FIG. 1 will now be described in more detail with reference to FIG. 2.

Figure 2:
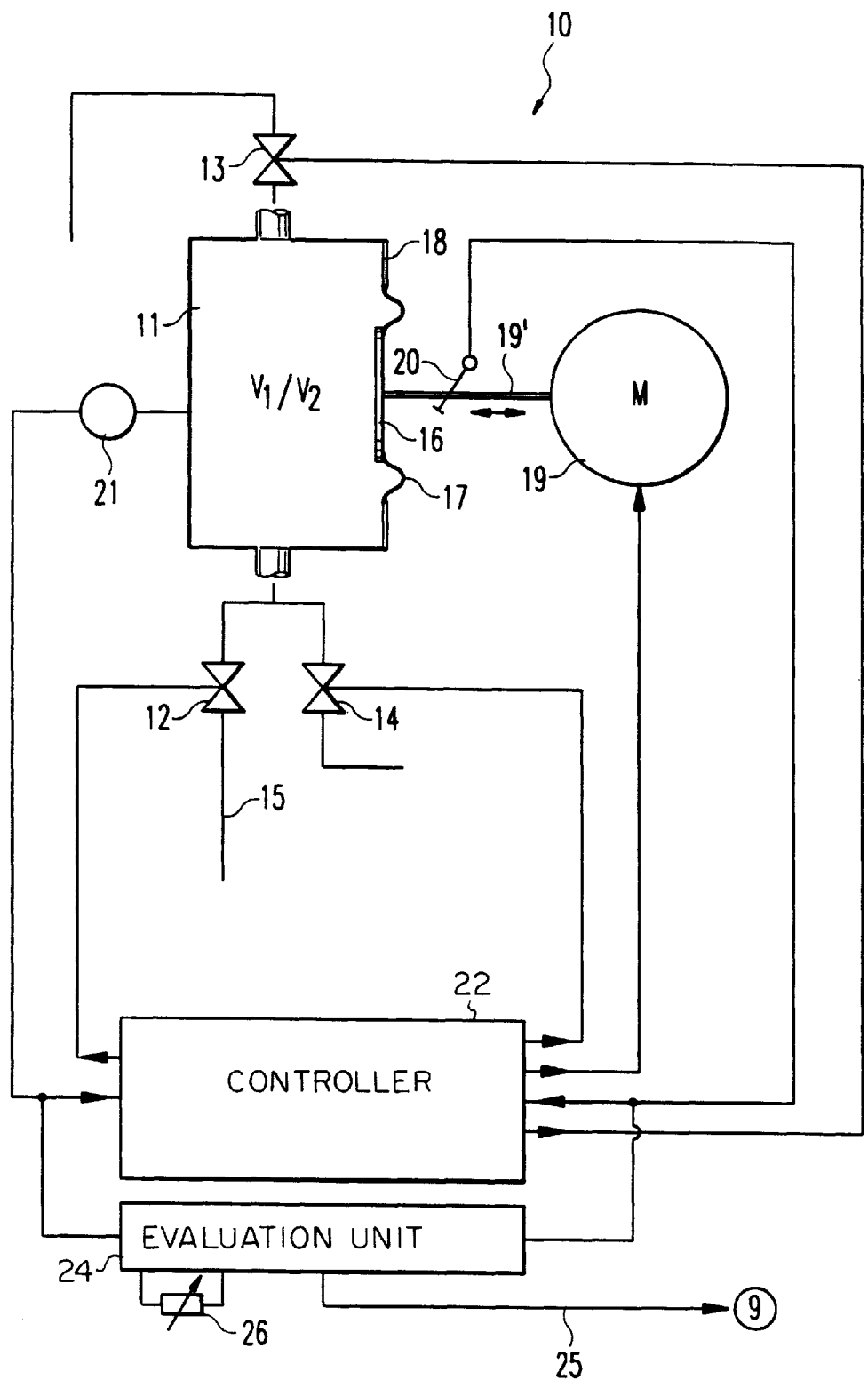
FIG. 2 is a schematic drawing of a measurement apparatus according to the second aspect of the invention for use in the control of the coating apparatus.

The measurement apparatus 10 shown in FIG. 2 comprises the above-mentioned measurement cell 11, the content of which is bounded by a chamber wall 18. In the chamber wall 18, and sealed thereto by a membrane 17, a piston 16 is mounted, which can be displaced by a drive motor 19 and a piston rod 19' from a position outside the measurement cell 11 into a position such that the piston 16 is within the measurement cell 11 and hence reduces the volume of the latter. The movement of the piston 16, or of the motor 19 that drives it, or of the driving piston rod 19', is sampled and converted to a measurement signal by means of a volume meter 20. The measurement signal is sent to a controller 22 for further evaluation.

The controller 22 is further connected by control leads to the inlet valve 12, the rinsing valve 14, and the outlet valve 13, in such a way that these valves can be opened and closed by means of the controller 22.

The measurement cell 11 is further connected to the input of a pressure meter 21, which generates a measurement signal corresponding to the pressure within the measurement cell 11; this signal in turn is sent to the controller 22. The measurement signals from the volume meter 20 and the pressure meter 21 are also sent to an evaluation unit 24, which from the measurement signals derives a signal representing the content of air inclusions. The latter signal can take the form of a control signal such as a control current or a digital value, usable both for process control and to indicate or control an alarm device. This measurement signal can, as mentioned above, be sent to the degassing means 9 by way of the control lead 25.

At the evaluation unit 24 there is further disposed a maximal-level adjuster 26 (here represented by the symbol for a potentiometer), which transmits to the evaluation unit 24 a set-point value to which the content of air inclusions in the coating material is to be adjusted in a control process. However, this adjustment can also occur by means of a non-automated process.

During operation of the coating apparatus, samples of the circulating coating material are taken, preferably at regular intervals, as shown in FIG. 1. For this purpose, while the rinsing valve 14 is closed and the outlet valve 13 is open, the inlet valve 12 is opened by the controller 22 for a period of time sufficient to fill the measurement cell 11. As soon as the measurement cell 11 is full, the inlet valve 12 and the outlet valve 13 are closed. During this step of the procedure, the piston 16 has been pulled back by its drive, away from the interior of the measurement cell 11, that is, displaced to the right as shown in FIG. 2, its position thus being such as to form a first volume $V_1$ in the interior of the measurement cell 11.

After the inlet valve 12 and the outlet valve 13 have closed, the rinsing valve 14 also remaining closed, the piston 16 is displaced by the drive motor 19 in such a way that the content of the measurement cell 11 is reduced to a smaller volume $V_2$. At the same time, the pressure in the interior of the measurement cell 11 rises from an initial, atmospheric pressure $p_1$, which was established at the beginning of the sampling process when the inlet valve 12 was closed and the outlet valve 13 was still open, to a higher pressure. In this process, the controller 22 causes the drive motor 19 to displace the piston 16 so as to reduce the volume of the measurement cell 11, until the pressure reaches a specific, predetermined pressure $p_2$, which has been preset in the controller 22. As soon as this pressure has been reached, the measured volume change corresponding to this pressure $p_2$, which is elevated with respect to the initial pressure p1, is sent from the volume meter 20 into the evaluation unit 24. This evaluation unit 24 now has available for evaluation the initial volume $V_1$ of the measurement cell 11 at the initial pressure p1, and the volume $V_2$ of the measurement cell 11 at the elevated pressure $p_2$. From these values is calculated, on the basis of the Boyle-Mariott Law: p×V=constant, the proportion of free gas in the sample. For subsequent use, such as the display or representation of an actual value in a control system, this value can now be converted to a suitable form for digital display or for controlling valves, etc.

After the generation of the measured value, the outlet valve 13 and rinsing valve 14 are opened, the sample contained in the measurement cell is discharged and the interior of the measurement cell 11 is rinsed. As soon as the piston 16 has returned to its original position, which defines the volume $V_1$, a new measurement process can begin.

The measurement cell 11 with piston 16 and its drive is preferably realized by a diaphragm-type dosing pump of a conventional kind, the drive motor of which preferably comprises a stepping motor. The volume meter 20 can then consist of an angle-of-rotation indicator. The measurement of volume change can also be accomplished by simply counting the step pulses that control the stepping motor as it advances the piston 16. In this case, during the emptying of the measurement cell 11, the piston is first inserted further into the measurement cell 11, beyond its position at the end of the measurement process, before it is returned to its initial position at volume $V_1$.

What is claimed is:

1. A method of operating a coating apparatus for the application of a coating material to paper or to cardboard, comprising the steps of:

introducing a sample of the coating material into a measurement cell with a closed first volume at a predetermined first pressure that corresponds substantially to the atmospheric pressure;

reducing the closed first volume to a closed second volume at which a predetermined second pressure that is greater than the predetermined first pressure prevails within the measurement cell;

deriving the air inclusion content of the sample from the change in volume necessary to produce the pressure change;

using the measured air inclusion content of the sample to adjust the operation of a degassing means for at least partly removing the air included in the coating material before the coating material is applied by the coating apparatus.

2. A method as claimed in claim 1, wherein the reduction of the first volume to the second volume occurs within a predetermined time span.

3. A method as claimed in claim 1, wherein the operation of the degassing means is automatically controlled by the measured air inclusion content of the sample.

4. A method as claimed in claim 1, wherein the degassing means comprises a chemical degassing means and degassing agents are added to the coating material in an amount controlled in dependence on the derived air inclusion content.

5. A method as claimed in claim 1, wherein the degassing means comprises a mechanical degassing means, the operation of which is controlled in dependence on the derived air inclusion content.

6. A method as claimed in claim 1, wherein the air inclusion content of the coating material is adjusted to a maximal level at which there is no appreciable impairment of the coating morphology and of the evenness of application of the coating material.

7. A method as claimed in claim 1, comprising the additional step of rinsing the measurement cell with water to remove remnants of the sample after the air inclusion content of the sample has been derived.

8. A measurement apparatus for use in the operation of a coating apparatus for applying a coating material to paper or to cardboard and comprising:

a measurement cell defining at least one inlet/outlet;

controllable valve means for the inlet/outlet, whereby the measurement cell can accommodate an introduced sample of the coating material in a first predetermined volume at a first predetermined pressure;

volume-changing means attached to the measurement cell, whereby the first predetermined volume can be reduced to a second volume;

a volume meter for measuring the change in volume of the measurement cell effected by the volume-changing means;

a pressure meter for measuring the pressure in the measurement cell;

control means connected to the pressure meter, to the volume-changing means, and to the valve means and operable such that after the sample has been introduced into the measurement cell and the valve means have been closed, the first volume is reduced to the second volume whereat the pressure in the measurement cell reaches a predetermined second value; and evaluation means which is operable to derive the air inclusion content of the sample from the difference between the first and second pressure values and the difference between the first and second volumes, and to generate a corresponding measurement signal.

9. An measurement apparatus as claimed in claim 8, wherein the control means comprises a timer and is so constructed that the reduction of the first volume to the second volume occurs within a predetermined time span.

10. A measurement apparatus as claimed in claim 8, wherein the evaluation means is connected by a control lead to a degassing means in such a way that operation of the degassing means can be controlled according to the measurement signal.

11. A measurement apparatus as claimed in claim 10, wherein the evaluation means comprises a maximal-level adjustor and cooperates with the degassing means in such a way that the air inclusion content in the coating material can be adjusted to a maximal level at which there is no appreciable impairment of coating morphology and the evenness of application of the coating material by the coating apparatus.

12. A measurement apparatus as claimed in claim 8, wherein the volume-changing means comprises a piston which can be advanced into the measurement cell by a drive motor.

13. A measurement apparatus as claimed in claim 8, wherein the volume-changing means comprises a diaphragm-type dosing pump with a rotating drive, the angle of rotation of which is monitored by the volume meter.

14. A measurement apparatus as claimed in claim 8, comprising a rinsing valve through which water can enter the measurement cell and which is disposed in parallel with an inlet valve through which the sample is introduced into the measurement cell.

* * * * *